United States Patent
Nakamura

(10) Patent No.: US 9,103,699 B2
(45) Date of Patent: Aug. 11, 2015

(54) ENCODER AND APPARATUS USING THE SAME

(71) Applicant: CANON KABUSHIKI KAISHA, Tokyo (JP)

(72) Inventor: Hitoshi Nakamura, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 202 days.

(21) Appl. No.: 13/873,476

(22) Filed: Apr. 30, 2013

(65) Prior Publication Data

US 2013/0292556 A1 Nov. 7, 2013

(30) Foreign Application Priority Data

May 2, 2012 (JP) ................. 2012-105162

(51) Int. Cl.
*G01D 5/34* (2006.01)
*G01D 5/347* (2006.01)

(52) U.S. Cl.
CPC ........ *G01D 5/34776* (2013.01); *G01D 5/34746* (2013.01)

(58) Field of Classification Search
CPC ....................................................... G01D 5/34
USPC ............ 250/231.1–231.18; 33/706, 707, 1 N, 33/1 PT; 341/13, 14; 356/616, 617
See application file for complete search history.

(56) References Cited

U.S. PATENT DOCUMENTS 5,456,021 A 10/1995 Nelle

FOREIGN PATENT DOCUMENTS

| EP | 0585622 A2 | 3/1994 |
| JP | H06174421 A | 6/1994 |
| JP | 2012-026765 A | 2/2012 |

*Primary Examiner* — Renee D Chavez
(74) *Attorney, Agent, or Firm* — Rossi, Kimms & McDowell LLP

(57) ABSTRACT

The encoder includes a scale having a first periodic pattern and a second periodic pattern, a sensor relatively movable with the scale. The sensor outputs in a first detection state a first periodic signal changing with a change period corresponding to the first periodic pattern and outputs in a second detection state a second periodic signal changing with a longer change period corresponding to the second periodic pattern than that of the first periodic signal. A processor calculates a position in a relative movement direction of the scale and sensor by using both the first and second periodic signals. The processor takes in the second periodic signal, the first periodic signal and the second periodic signal in this order at mutually different times, calculates phases of the second, first and second periodic signals at a specific time and calculates the position at the specific time by using the calculated phases.

4 Claims, 3 Drawing Sheets

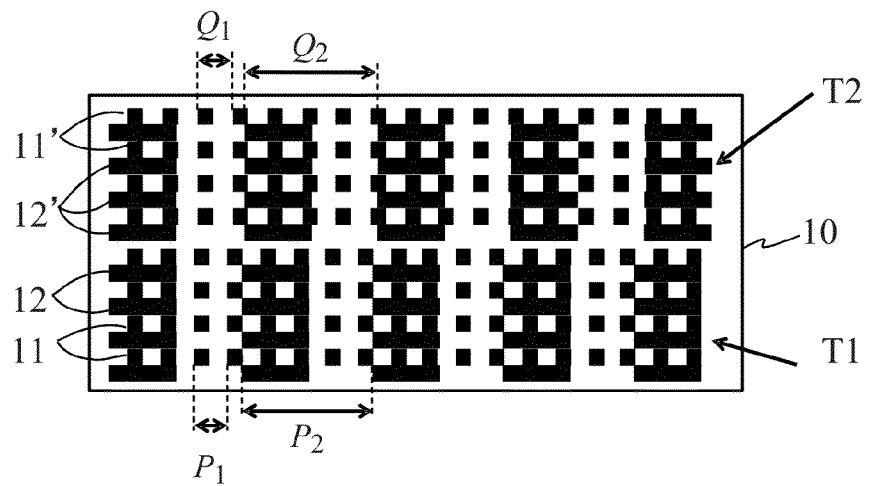
FIG. 5
| TIME | 0 | Δt | ... | t+Δt | t+2Δt | ... | 2t+2Δt |
|---|---|---|---|---|---|---|---|
| PHASE | $\theta_{Q2}$ | $\theta_{P2\_1}$ | | $\theta_{Q1}$ | $\theta_{P1}$ | | $\theta_{P2\_2}$ |
| | | | | | | | $\theta_{P1\_2}$ |
| | | | | | | | $\theta_{Q1\_2}$ |
| | | | | | | | $\theta_{Q2\_2}$ |
FIG. 6
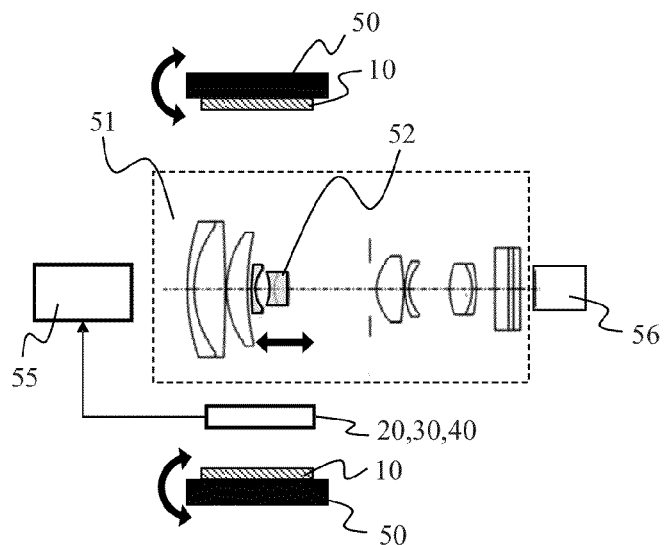
FIG. 7

ENCODER AND APPARATUS USING THE SAME

BACKGROUND OF THE INVENTION

1. Field of the Invention

The present invention relates to an encoder that is usable for various apparatuses such as optical apparatuses and outputs, with relative movement of a scale and a sensor, a signal showing position of a movable member provided in the apparatus.

2. Description of the Related Art

Encoders that are used to detect position and speed of a movable member are constituted by a scale provided with a periodic pattern and a sensor outputting a periodic signal that periodically changes corresponding to the periodic pattern with relative movement of the sensor and the scale. Such encoders include an incremental encoder that, for example, produces two periodic signals (two phase signals) having mutually different phases from one periodic pattern and detects a relative position of the scale and the sensor from number of periods and the phases of the two phase signals. Moreover, the encoders also include an absolute encoder that, for example, produces two paired two phase signals from two periodic patterns having mutually different periods and detects an absolute position of the scale or the sensor from a difference (phase difference) between the phases of one of the two paired two phase signals and the phases of the other paired two phase signals.

Such an absolute encoder has an advantage that a reset operation to detect a reference position for position detection before start of the position detection such as at a time of power-on, which is needed for the incremental encoder, is not needed.

Japanese Patent Laid-Open No. 2012-026765 discloses an absolute encoder capable of acquiring more information from a small number of scale tracks by forming multiple periodic patterns whose periods are mutually different in one scale track and by switching a detection period of a sensor in chronological order. The absolute encoder disclosed in Japanese Patent Laid-Open No. 2012-026765 requires, in order to read the periodic patterns having the mutually different periods in chronological order, switching of the detection period of the sensor according to the period of the periodic pattern to be read.

However, switching of the detection period of the sensor generally needs a sufficient time period though it depends on characteristics of the sensor and a circuit relating thereto. Moreover, since reading of the periodic pattern, that is, detection of a positional change cannot be performed during the switching of the detection period, a large relative positional change amount (high relative movement speed) of the scale and the sensor during the switching of the detection period generates a detection error in a detected position after the switching of the detection period.

SUMMARY OF THE INVENTION

The present invention provides an encoder capable of position detection with high accuracy, regardless of relative movement amount (relative movement speed) of a scale and a sensor.

The present invention provides as one aspect thereof an encoder including a scale provided with a first periodic pattern and a second periodic pattern whose period is different from that of the first periodic pattern, a sensor relatively movable with the scale and switchable to a first detection state to read the first periodic pattern and a second detection state to read the second periodic pattern, the sensor being configured to output in the first detection state a first periodic signal that changes with a change period corresponding to the first periodic pattern and to output in the second detection state a second periodic signal that changes with a longer change period corresponding to the second periodic pattern than that of the first periodic signal, and a processor configured to calculate a position in a relative movement direction of the scale and sensor by using both the first and second periodic signals taken in from the sensor. The processor is configured to take in the second periodic signal, the first periodic signal and the second periodic signal in this order at mutually different times, to calculate phases of the second, first and second periodic signals at a specific time and to calculate the position at the specific time by using the calculated phases.

The present invention provides as another aspect thereof an apparatus including a movable member whose position is detected by using the encoder.

Further features of the present invention will become apparent from the following description of exemplary embodiments with reference to the attached drawings.

BRIEF DESCRIPTION OF THE DRAWINGS

FIG. 5 shows a scale to be used in the encoder of Embodiment 2.

FIG. 6 shows a relation between times and phases in the encoder of Embodiment 2.

FIG. 7 shows a configuration of an image pickup apparatus that is Embodiment 3 of the present invention.

DESCRIPTION OF THE PREFERRED EMBODIMENTS

Embodiments of the present invention will hereinafter be described with reference to the accompanying drawings.

Embodiment 1

Figure 1:
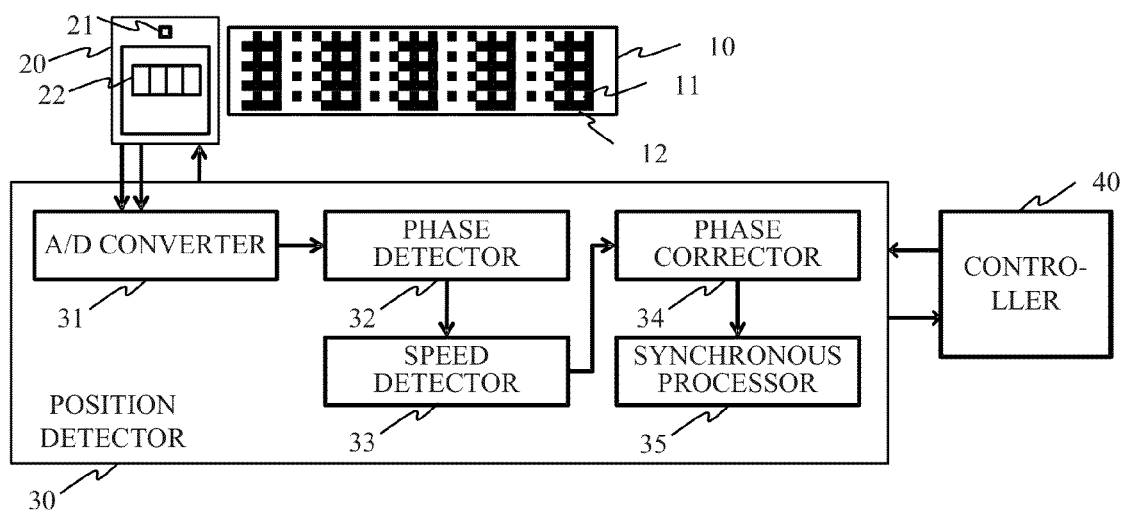
FIG. 1 is a block diagram showing a configuration of an encoder that is Embodiment 1 of the present invention.

FIG. 1 shows a configuration of a position detection encoder (hereinafter referred to as "an encoder") that is a first embodiment (Embodiment 1) of the present invention. The encoder 1 is constituted by a scale 10, a sensor 20, a position detector (processor) 30 and a controller 40. The encoder 1 is an optical reflective absolute encoder capable of detecting a relative position of the scale 10 and sensor 20.

The scale 10 is attached to a position detection object member as a movable member that is provided in various apparatuses such as optical apparatuses. The sensor 20 is attached to an immovably fixed member such as a chassis of the apparatus. The encoder 1 of this embodiment outputs a signal showing movement amount (that is, position) of the scale 10 with movement of the scale 10 relative to the sensor 20. However, a configuration may be employed in which the sensor 20 is attached to the position detection object member and the scale 10 is attached to the fixed member and thereby a signal is output from the sensor 20 with movement of the sensor 20 relative to the scale 10. That is, it is only necessary that the scale 10 and the sensor 20 are relatively moved. Moreover, the encoder 1 of this embodiment is able to be used as a linear encoder and a rotary encoder.

In response to input of a position detection request signal from a system (not shown) of the apparatus equipped with the encoder, the controller 40 causes the position detector 30 that receives signals from the sensor 20 to perform a position detection process. Then, the controller 40 outputs information on an absolute position of the position detection object member, which has been produced by the position detector 30, to the system of the apparatus.

Figure 2:
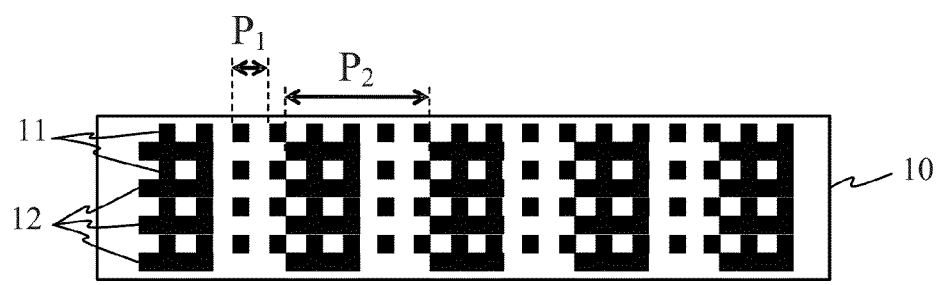
FIG. 2 shows a scale to be used in the encoder of Embodiment 1.

FIG. 2 shows the scale 10. In the following description, as directions for the scale 10, a direction corresponding to a relative movement direction of the scale 10 and sensor 20 is referred to as "a longitudinal direction", and a direction orthogonal to the longitudinal direction is referred to as "a width direction". The scale 10 is provided with two periodic patterns including a first periodic pattern 11 and a second periodic pattern 12 each of which includes reflective portions and non-reflective portions alternately arranged in the longitudinal direction at a constant period (pitch). The first periodic pattern 11 and the second periodic pattern 12 respectively have pitches $P_1$ and $P_2$ different from each other and are alternately arranged in the width direction. In the following description, the first periodic pattern 11 is simply referred to as "a first pattern 11", and the pitch $P_1$ thereof is referred to as "a first pitch $P_1$". Moreover, the second periodic pattern 12 is simply referred to as "a second pattern 12", and the pitch $P_2$ thereof is referred to as "a second pitch $P_2$".

The first pitch $P_1$ is set to about ¼ of the second pitch $P_2$, that is, the second pattern 12 has a period longer (coarser) than that of the first pattern 11. The first pattern 11 includes 79 periods and the second pattern 12 includes 20 periods in a total length of a longitudinal range where the first and second patterns 11 and 12 are provided in the scale 10. The total length of the longitudinal range where the first and second patterns 11 and 12 are provided is hereinafter referred to as "a total pattern length".

The sensor 20 includes, as shown in FIG. 1, a light source 21 and a light receiver (detector) 22. The light source 21 is constituted by a light emitting element such as an LED. The light receiver 22 is constituted by multiple photoelectric conversion elements (light receiving elements), each of which photoelectrically converts light emitted from the light source 21 and reflected by the reflective portions of the first and second patterns 11 and 12.

Moreover, the sensor 20 switches a detection period of the light receiver 22, in response to a detection period switch signal from the position detector 30, between a first detection period $P_0$ and a second detection period $4 \cdot P_0$. The first detection period $P_0$ is identical or sufficiently close to the first pitch $P_1$, and the second detection period $4 \cdot P_0$ is identical or sufficiently close to the second pitch $P_2$.

The light receiver 22 is brought into a first detection state of being able to read the first pattern 11 in response to setting of the first detection period. The switching of the detection period is performed by changing, among the multiple light receiving elements constituting the light receiver 22, a combination of the light receiving elements forming each of two or more light receiving areas so as to change a width and a pitch of the light receiving area in the relative movement direction of the sensor 20 and scale 10.

The light receiver 22 reads the first pattern 11 to output two phase sine-wave signals each having a change period corresponding to the first pitch $P_1$ and having a phase difference of 90 degrees. The two phase sine-wave signals thus produced from the first pattern 11 correspond to a first periodic signal and are hereinafter referred to as "first two phase signals". On the other hand, the light receiver 22 is brought into a second detection state of being able to read the second pattern 12 in response to setting of the second detection period. The light receiver 22 reads the second pattern 12 to output two phase sine-wave signals each having a change period corresponding to the second pitch $P_2$ and having a phase difference of 90 degrees. The two phase sine-wave signals thus produced from the second pattern 12 correspond to a second period signal and are hereinafter referred to as "second two phase signals". The second two phase signals have a period longer than that of the first two phase signals (that is, a longest one of the periods of the first and second two phase signals).

The position detector 30 performs the position detection process described below by using the first and second two phase signals output from the sensor 20 (light receiver 22). The controller 40 controls, in response to the input of the position detection request signal from the system of the apparatus, the switching of the detection period of the sensor 20 (that is, output of the detection period switch signal from the position detector 30) and the position detection process performed by the position detector 30.

Next, description will be made of the position detection process performed by the position detector 30. In the positional detection process, the position detector 30 calculates the position to be detected (hereinafter referred to as "a detection target position") in the relative movement direction of the scale 10 and sensor 20 by using both the first and second two phase signals taken in from the sensor 20 (light receiver 22) whose detection period is set to the first and second detection periods. In the position detection process, the position detector 30 takes in the second two phase signals, the first two phase signals and the second two phase signals in this order at mutually different times and calculates phases of the second, first and second two phase signals at a specific time. Then, the position detector 30 calculates the detection target position at the specific time by using the calculated phases.

The position detector 30 first sets the detection period of the sensor 20 to the second detection period $(4 \cdot P_0)$ and samples the second two phase signals through an A/D converter 31. Next, the position detector 30 switches the detection period of the sensor 20 to the first detection period $(P_0)$ in response to the detection period switch signal from the controller 40 and samples the first two phase signals through the A/D converter 31. In addition, the position detector 30 switches the detection period of the sensor 20 to the second detection period in response to the detection period switch signal from the controller 40 and samples the second two phase signals again. Thus, the position detector 30 performs three samplings of the two phase signals (sampling of the second two phase signals sampling of the first two phase signals→sampling of the second two phase signals). Then, the position detector 30 inputs three pairs of the two phase signals (three paired two phase signals) sampled thereby three times and converted by the A/D converter 31 into digital signals to a phase detector 32. The times at which the three samplings are performed have a fixed time interval thereamong. In the following description, a first sampling time of the second two phase signals is defined as 0, a next sampling time of the first two phase signals is defined as t, and a last sampling time of the second two phase signals is defined as 2t.

The phase detector 32 calculates a phase of each of the three paired two phase signals by performing arctan calculation on each of the three paired two phase signals. The two phase signals are constituted by a sine-wave signal and a cosine-wave signal, so that the arctan calculation provides the phase. In the following description, a calculated phase of the second two phase signals first sampled is defined as $\theta_{P2\_1}$, a calculated phase of the first two phase signals next sampled is defined as $\eta_{P1}$, and a calculated phase of the second two phase signals last sampled is defined as $\theta_{P2\_2}$. The phase is expressed by a value from 0 to $2\pi$, which is uniquely decided in one pitch (period), and therefore the phase shows a position in one pitch.

The three phases calculated by the phase detector 32 are input to a speed detector 33. The sampling times of the three phases $\theta_{P2\_1}$, and $\theta_{P2\_2}$ are mutually different, so that, when the scale 10 and the sensor 20 are relatively moved, the three phases $\theta_{P2\_1}$, $\theta_{P1}$ and $\theta_{P2\_2}$ correspond to mutually different positions. Thus, in this embodiment, the speed detector 33 estimates a relative movement speed of the scale 10 and sensor 20.

Then, a phase corrector 34 corrects (converts), by using the estimated relative movement speed, the phases (which have been calculated by the phase detector 32) of the two paired two phase signals sampled at the different times from the specific time to phases at the specific time. Furthermore, a synchronous processor 35 calculates a position in the relative movement direction of the scale 10 and sensor 20 from the corrected phases at the specific time. In this embodiment, the synchronous processor 35 calculates the position at the time 2t as the specific time.

The speed detector 33 estimates the relative movement speed of the scale 10 and sensor 20 from change amounts of the phase and sampling time. Since a difference between the sampling times of the phases $\theta_{P2\_1}$ and $\theta_{P2\_2}$ is 2t, the relative movement speed u is calculated by the following expression (1):

$$u = \frac{P_2 \cdot \frac{(\theta_{P2\_2} - \theta_{P2\_1})}{2\pi}}{2t} \tag{1}$$

The phase corrector 34 calculates the phase $\theta_{P1\_2}$ of the first two phase signals at the time 2t. Since the sampling time of the phase $\theta_{P1}$ is t, the phase $\theta_{P1\_2}$ is calculated by adding the phase change amount during a time period t at the relative movement speed u to the phase $\theta_{P1}$ as shown by the following expression (2):

$$\theta_{P1\_2} = \theta_{P1} + \frac{2\pi u t}{P_1} = \theta_{P1} + (\theta_{P2\_2} - \theta_{P2\_1}) \cdot \frac{P_2}{P_1} \cdot \frac{1}{2} \tag{2}$$

Thus, the phases $\theta_{P1\_2}$ and $\theta_{P2\_2}$ of the first and second two phase signals at the time 2t are obtained. The synchronous processor 35 calculates the position at the time 2t as an absolute position by using the phases $\theta_{P1\_2}$ and $\theta_{P2\_2}$.

Specifically, the synchronous processor 35 first quadruples the phase $\theta_{P2\_2}$ of the second two phase signals corresponding to the second pattern 12 that includes 20 periods in the total pattern length to produce a phase for 80 periods. Then, the synchronous processor 35 calculates a difference (phase difference) between the phase for 80 periods and the phase $\theta_{P1\_2}$ of the first two phase signals corresponding to the first pattern 11 that includes 79 periods in the total pattern length, which results in that the phase difference is one period in the total pattern length. The phase difference of one period in the total pattern length provides the absolute position. The phase difference represented by $\theta_{V1}$ is expressed by the following expression (3) where MOD(x,y) represents a remainder when x is a dividend and y is a divisor.

$$\theta_{V1} = \text{MOD}(4 \cdot \theta_{P2\_2} - \theta_{P1\_2}, 2\pi) \tag{3}$$

Although the phase difference $\theta_{V1}$ expresses the absolute position, accuracy of the absolute position in one period is higher when using the phases $\theta_{P1\_2}$ and $\theta_{P2\_2}$ than when using the phase difference $\theta_{V1}$. Therefore, the synchronous processor 35 calculates a more accurate absolute position than the phase difference $\theta_{V1}$ by using the phases $\theta_{P1\_2}$ and $\theta_{P2\_2}$ together with $\theta_{V1}$.

Since the second pattern 12 includes 20 periods in the total pattern length, the phase $\theta_{P2\_2}$ changes from 0 to $2\pi$ twenty times therein. On the other hand, the phase difference $\theta_{V1}$ changes from 0 to $2\pi$ once in the total pattern length, which means that a phase change amount of the phase difference $\theta_{V1}$ per a unit movement amount is 1/20 of that of the phase $\theta_{P2\_2}$. Thus, the synchronous processor 35 calculates number of periods (period number) of the phase $\theta_{P2\_2}$ from a predetermined reference position by using the phase difference $\theta_{V1}$ and the phase $\theta P_{2\_2}$, and thereby calculates an absolute position with an accuracy attainable by using the phase $\theta_{P2\_2}$.

Figure 3:
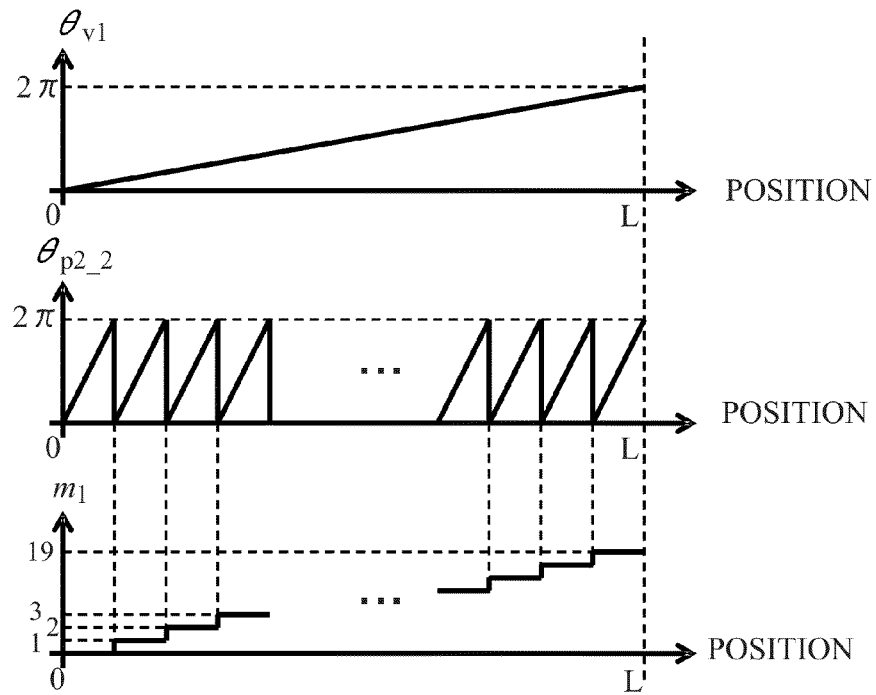
FIG. 3 shows a relation among phase difference, phase and period number with respect to position in the encoder of Embodiment 1.

When the period number of the phase $\theta_{P2\_2}$ is represented by $m_1$ and the total pattern length is represented by L, a relation among the phase difference $\theta_{V1}$, the phase $\theta_{P2\_2}$ and the period number $m_1$ with respect to position is as illustrated in FIG. 3.

In addition, when the absolute position calculated with the accuracy attainable by using the phase $\theta_{P2\_2}$ is represented by $\theta_1$, this absolute position $\theta_1$ is expressed by the following expressions (4) and (5) using $m_1$ and $\theta_{P2\_2}$, where ROUND (x) represents rounding of x to an integral value:

$$m_1 = \text{ROUND}\left(\frac{20 \cdot \theta_{V1} - \theta_{P2\_2}}{2\pi}\right) \tag{4}$$

$$\theta_1 = \frac{2\pi m_1 + \theta_{P2\_2}}{20} \tag{5}$$

Next, the synchronous processor 35 similarly calculates, from the absolute position $\theta_1$ and the phase $\theta_{P1\_2}$, an absolute position $\theta_2$ with an accuracy attainable by using the phase $\theta_{P1\_2}$. In this calculation, since the first pattern 11 includes 79 periods in the total pattern length, the absolute position $\theta_2$ is expressed by the following expressions (6) and (7) where $m_2$ represents a period number of the phase $\theta P_{1\_2}$:

$$m_2 = \text{ROUND}\left(\frac{79 \cdot \theta_1 - \theta_{P1\_2}}{2\pi}\right) \tag{6}$$

$$\theta_2 = \frac{2\pi m_2 + \theta_{P1\_2}}{79} \tag{7}$$

The synchronous processor 35 outputs information on the absolute position $\theta_2$ thus calculated to the controller 40. The controller 40 outputs the information on the absolute position $\theta_2$ to the system of the apparatus.

A signal change amount of the second two phase signals corresponding to the second pattern 12 having a long period, with respect to a change of the relative position of the scale 10 and sensor 20, is smaller than that of the first two phase signals corresponding to the first pattern 11 having a short period. Therefore, the encoder of this embodiment can respond to a larger relative positional change at a faster relative movement speed. Thus, the encoder of this embodiment can increase a phase correctable range at a time at which an absolute position is to be calculated even if the scale 10 and the sensor 20 are relatively moved at a high speed, which results in suppression of position detection error and thereby in position detection with high accuracy.

Although this embodiment described the case of detecting (calculating) the absolute position at the specific time defined as 2t, an absolute position at a different specific time from 2t may be detected. For example, detecting a position at the time 0 as the absolute position enables detection of a position at a timing close to an input timing of the position detection request signal. This example is suitable for a case where the system of the apparatus requires a position at the input timing of the position detection request signal.

Moreover, calculating a position at the time t as the absolute position enables calculation of a phase of the second pattern at the time t as an average of the phases $\theta_{P2\_1}$ and $\theta_{P2\_2}$ as shown by the following expression (8), regardless of the relative movement speed u. This calculation enables reduction of a calculation amount and thereby enables reduction of a time period needed for the position detection. In the expression (8), $\theta_{P2\_3}$ represents a phase of the second two phase signals corresponding to the second pattern at the time t. This case does not need the calculation of the relative movement speed u and thereby can eliminate the speed detector 33 shown in FIG. 1.

$$\theta_{P2\_3} = \theta_{P2\_1} + \frac{2\pi ut}{P_2} = \frac{\theta_{P2\_1} + \theta_{P2\_2}}{2} \quad (8)$$

Furthermore, although this embodiment described the case of performing the position detection in response to the position detection request signal, a configuration may be employed which provides a timer in the controller 40 to perform the position detection at a constant time interval. This configuration provides advantages such as making it hard to receive an influence of jitter of a communication time for the position detection request signal and making it easy to design the encoder independently from the system of the apparatus.

Moreover, although this embodiment described the encoder using the two periodic patterns having mutually different periods (pitches), three or more periodic patterns having mutually different periods may be used. Increasing number of the periodic patterns enables reduction of position detection error or increase of a length range of the position detection. In this case, the position detection may be performed by using a paired two phase signals having a longest period among three or more paired two phase signals corresponding to the three or more periodic patterns as the second two phase signals and by using the all other two phase signals as the first two phase signals. This case can more effectively obtain the effect that the encoder can respond to a larger relative positional change at a faster relative movement speed. This also applies to Embodiment 2 described later.

Embodiment 2

Figure 4:
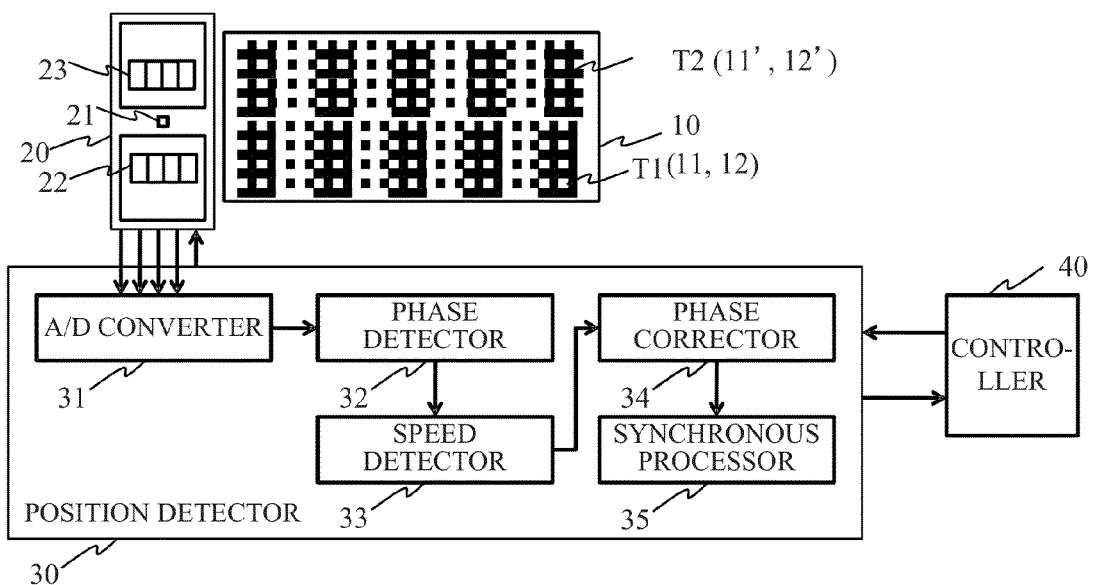
FIG. 4 is a block diagram showing a configuration of an encoder that is Embodiment 2 of the present invention.

FIG. 4 shows a configuration of an encoder that is a second embodiment (Embodiment 2) of the present invention. The encoder of this embodiment is, as well as the encoder of Embodiment 1, an optical reflective absolute encoder that detects a position (absolute position) of one of a scale 10 and a sensor 20, which are relatively moved, with respect to the other thereof. However, this embodiment provides to the scale 10 two tracks T1 and T2 each including a first pattern 11 and a second pattern 12 similar to those in Embodiment 1. On the other hand, this embodiment provides to the sensor 20 two light receivers 22 and 23 similarly configured to the light receiver 22 in Embodiment 1. Other components in this embodiment are same as those in Embodiment 1, and therefore this embodiment will mainly describe differences from Embodiment 1.

As shown in FIG. 5 in detail, the track T1 in the scale 10 is provided with first and second patterns 11 and 12 alternately arranged in a width direction of the scale 10; the first and second patterns 11 and 12 have mutually different pitches $P_1$ and $P_2$ in a longitudinal direction of the scale 10. Moreover, the track T2 in the scale 10 is provided with first and second patterns 11' and 12' alternately arranged in the width direction of the scale 10; the first and second patterns 11' and 12' have mutually different pitches $Q_1$ and $Q_2$ in the longitudinal direction of the scale 10. Total pattern lengths of the tracks T1 and T2 are equal to each other. The second patterns 12 and 12' have larger (coarser) periods than those of the first patterns 11 and 11'. The first and second patterns 11 and 12 in the track T1 respectively include 160 periods and 40 periods. On the other hand, the first and second patterns 11' and 12' in the track T2 respectively include 152 periods and 39 periods.

The light receiver 22 of the sensor 20 is constituted by multiple photoelectric conversion elements photoelectrically converting light emitted from a light source 21 and reflected by reflective portions of each of the first and second patterns 11 and 12 in the track T1. The light receiver 23 of the sensor 20 is constituted by multiple photoelectric conversion elements photoelectrically converting light emitted from the light source 21 and reflected by reflective portions of each of the first and second patterns 11' and 12' in the track T2.

The sensor 20 switches a detection period of each of the light receivers 22 and 23 in response to a detection period switch signal from a position detector 30. Specifically, the sensor 20 switches the detection period of each of the light receivers 22 and 23 between a first detection period $P_0$ and a second detection period $4 \cdot P_0$. The first detection period $P_0$ is identical or sufficiently close to the first pitches $P_1$ and $Q_1$, and the second detection period $4 \cdot P_0$ is identical or sufficiently close to the second pitches $P_2$ and $Q_2$.

The light receivers 22 and 23 are brought into a first detection state of being able to read the first patterns 11 and 11' in response to setting of the first detection period. The light receiver 22 reads the first pattern 11 to output first two phase signals (first periodic signal) as two phase sine-wave signals having a phase difference of 90 degrees. The first two phase signals output from the light receiver 22 have a change period corresponding to the first pitch $P_1$. The light receiver 23 reads the first pattern 11' to output first two phase signals (first periodic signal) as two phase sine-wave signals having a phase difference of 90 degrees. The first two phase signals output from the light receiver 23 have a change period corresponding to the first pitch $Q_1$.

The light receivers 22 and 23 are brought into a second detection state of being able to read the second patterns 12 and 12' in response to setting of the second detection period. The light receiver 22 reads the second pattern 12 to output second two phase signals (second periodic signal) as two phase sine-wave signals having a phase difference of 90 degrees. The second two phase signals output from the light receiver 22 have a change period corresponding to the second pitch $P_2$. The light receiver 23 reads the second pattern 12' to output second two phase signals (second periodic signal) as two phase sine-wave signals having a phase difference of 90 degrees. The second two phase signals output from the light receiver 22 have a change period corresponding to the second pitch $Q_2$.

The position detector 30 performs a position detection process described below by using the two pairs of the first and second two phase signals output from the sensor 20 (light receivers 22 and 23). A controller 40 controls, in response to input of a position detection request signal from a system of an apparatus, switching of the detection period of the sensor 20 (that is, output of the detection period switch signal from the position detector 30) and the position detection process performed by the position detector 30.

Next, description will be made of the position detection process performed by the position detector 30. Also in the position detection process in this embodiment, the position detector 30 calculates a position in a relative movement direction of the scale 10 and sensor 20 by using both the first and second two phase signals taken in from the sensor 20 (light receivers 22 and 23) whose detection period is set to the first and second detection periods. In the position detection process, the position detector 30 takes in the second two phase signals, the first two phase signals and the second two phase signals in this order at mutually different times and calculates phases of the second, first and second two phase signals at a specific time. Then, the position detector 30 calculates a detection target position at the specific time by using the calculated phases. In this embodiment in which the two tracks T1 and T2 are provided, the position detector 30 first takes in the second two phase signals from the tracks T2 and T1 in this order, next takes in the first two phase signals from the tracks T2 and T1 in this order 1 and last takes in the second two phase signals only from the track T1.

The position detector 30 first outputs the detection period switch signal to the sensor 20 to set the detection period of the sensor 20 to the second detection period ($4 \cdot P_0$). With this setting, the sensor 20 (light receivers 22 and 23) outputs two pairs of the second two phase signals (two paired second two phase signals) respectively corresponding to the second patterns 12 and 12'. In the following description, the second two phase signals corresponding to the second pattern 12 and output from the light receiver 22 are referred to as "P2 signals", and the second two phase signals corresponding to the second pattern 12' and output from the light receiver 23 are referred to as "Q2 signals".

The position detector 30 samples the two paired second two phase signals in order of the Q2 signals and the P2 signals through an A/D converter 31. The two paired second two phase signal (Q2 and P2 signals) converted into digital signals by the A/D converter 31 are input to a phase detector 32. The phase detector 32 performs arctan calculates on the Q2 and P2 signals to calculate phases $\theta_{Q2}$ and $\theta_{P2\_1}$ of the Q2 and P2 signals. A sampling time of the Q2 signals is defined as 0, and a next sampling time of the P2 signals is defined as $\Delta t$.

After the sampling of the second two phase signals, the position detector 30 outputs the detection period switch signal to the sensor 20 to switch the detection period of the sensor 20 (light receivers 22 and 23) to the first detection period ($P_0$). With this switching, the sensor 20 (light receivers 22 and 23) outputs two pairs of the first two phase signals (two paired first two phase signals) respectively corresponding to the first patterns 11 and 11'. In the following description, the first two phase signals corresponding to the first pattern 11 and output from the light receiver 22 are referred to as "P1 signals", and the first two phase signals corresponding to the first pattern 11' and output from the light receiver 23 are referred to as "Q1 signals".

The position detector 30 samples the two paired first two phase signals in order of the Q1 signals and the P1 signals through the A/D converter 31. The two paired first two phase signal (Q1 and P1 signals) converted into digital signals by the A/D converter 31 are input to the phase detector 32. The phase detector 32 performs arctan calculates on the Q1 and P1 signals to calculate phases $\theta_{Q1}$ and $\theta_{P1}$ of the Q1 and P1 signals. A sampling time of the Q1 signals is defined as $t+\Delta t$, and a next sampling time of the P1 signals is defined as $t+2\Delta t$.

After the sampling of the first two phase signals, the position detector 30 outputs the detection period switch signal to the sensor 20 to switch the detection period of the light receiver 22 of the sensor 20 to the second detection period ($4 \cdot P_0$) again. With this switching, the sensor 20 (light receiver 22) outputs the second two phase signals (P2 signals) corresponding to the second pattern 12. The phase detector 32 performs arctan calculates on the P2 signals to calculate phases $\theta_{P2\_2}$ of the P2 signals. A last sampling time of the P2 signals is defined as $2t+2\Delta t$.

The five phases $\theta_{Q2}$, $\theta_{P2\_1}$, $\theta_{Q1}$, $\theta_{P1}$ and $\theta_{P2\_2}$ thus obtained are input to the speed detector 33.

The sampling times of the five phases $\theta_{Q2}$, $\theta_{P2\_1}$, $\theta_{Q1}$, $\theta_{P1}$ and $\theta_{P2\_2}$ are mutually different, so that the five phases $\theta_{Q2}$, $\theta_{P2\_1}$, $\theta_{Q1}$, $\theta_{P1}$ and $\theta_{P2\_2}$ correspond to mutually different positions when the scale 10 and the sensor 20 are relativity moved. Therefore, in this embodiment, the speed detector 33 estimates a relative movement speed of the scale 10 and sensor 20 from the phases $\theta_{P2\_1}$ and $\theta_{P2\_2}$.

Then, a phase corrector 34 corrects (converts), by using the estimated relative movement speed, the phases (which have been calculated by the phase detector 32) of the four paired two phase signals at the different times from the specific time to phases at the specific time. Furthermore, a synchronous processor 35 calculates a position (absolute position) in the relative movement direction of the scale 10 and sensor 20 from the corrected phases at the specific time. In this embodiment, the synchronous processor 35 calculates the position at the time $2t+2\Delta t$ as the specific time.

FIG. 6 shows a relation between the times and the phases (including phases described later) and interrelations among the phases. In FIG. 6, a most upper row (first row) denotes the time, and subsequent rows denote the phases. Each column denotes the phases corresponding to the times shown in the first row. Arrows denote the interrelations between the phases. For example, an arrow pointing to the phase $\theta_{P1\_2}$ means that the phase $\theta_{P1\_2}$ is calculated by using the phase $\theta_{P1}$.

The speed detector 33 calculates a relative movement speed u of the scale 10 and sensor 20. Since a difference between the sampling times of the phases $\theta_{P2\_1}$ and $\theta_{P2\_2}$ is $2t+\Delta t$, the relative movement speed u is calculated by the following expression (9):

$$u = \frac{P_2 \cdot \frac{(\theta_{P2\_2} - \theta_{P2\_1})}{2\pi}}{2t + \Delta t} \quad (9)$$

The phase corrector 34 calculates phases $\theta_{Q2\_2}$, $\theta_{Q1\_2}$ and $\theta_{P1\_2}$ of the Q2 signals, the Q1 signals and the P1 signals at the time $2t+2\Delta t$ by using calculated relative movement speed u. The sampling times of the phases $\theta_{Q2}$, $\theta_{Q1}$ and $\theta_{P1}$ are 0, $t+\Delta t$ and $t+2\Delta t$, respectively, and differences between these times and the time $2t+2\Delta t$ are $2t+2\Delta t$, $t+\Delta t$ and t, respectively.

Therefore, the phases $\theta_{Q2\_2}$, $\theta_{Q1\_2}$ and $\theta_{P1\_2}$ at the time $2t+2\Delta t$ are respectively calculated by the following expressions (10), (11) and (12):

$$\theta_{Q2\_2} = \text{MOD}\left(\theta_{Q2} + \frac{2\pi u(2t+2\Delta t)}{Q_2}, 2\pi\right) \tag{10}$$

$$\theta_{Q1\_2} = \text{MOD}\left(\theta_{Q1} + \frac{2\pi u(t+\Delta t)}{Q_1}, 2\pi\right) \tag{11}$$

$$\theta_{P1\_2} = \text{MOD}\left(\theta_{P1} + \frac{2\pi ut}{P_1}, 2\pi\right) \tag{12}$$

The synchronous processor 35 calculates the position in the relative movement direction of the scale 10 and sensor 20 at the time $2t+2\Delta t$ by using the phases $\theta_{Q2\_2}$, $\theta_{Q1\_2}$ and $\theta_{P1\_2}$ at the time $2t+2\Delta t$ thus calculated. Since the second patterns 12 and 12' in the tracks T1 and T2 respectively include 40 periods and 39 periods in the total pattern length, a phase difference $\theta_{V1}$ between the P2 signals and the Q2 signals shows an absolute position. The phase difference $\theta_{V1}$ is calculated by the following expression (13):

$$\theta_{V1} = \text{MOD}(\theta_{P2} - \theta_{Q2}, 2\pi) \tag{13}$$

Moreover, the synchronous processor 35 similarly calculates a phase difference $\theta_{V8}$ of the P1 signals and the Q1 signals. Since the first patterns 11 and 11' in the tracks T1 and T2 respectively include 160 periods and 152 periods in the total pattern length, the phase difference $\theta_{V8}$ is 8 periods in the total pattern length. The phase difference $\theta_{V8}$ is calculated by the following expression (14):

$$\theta_{V8} = \text{MOD}(\theta_{P1} - \theta_{Q1}, 2\pi) \tag{14}$$

The synchronous processor 35 calculates an absolute position in the relative movement direction of the scale 10 and sensor 20 from $\theta_{V1}$, $\theta_{V8}$, $\theta_{P2\_2}$ and $\theta_{P1\_2}$ thus calculated, as well as in Embodiment 1. In the total pattern length, 1 period of the phase differences $\theta_{V1}$, 8 periods of the phase differences $\theta_{V8}$, 40 periods of the phase $\theta_{P2\_2}$ and 160 periods of the phase $\theta_{P1\_2}$ are respectively included. Therefore, $m_1$, $m_2$ and $m_3$ each representing an integer and $\theta_1$, $\theta_2$ and $\theta_3$ each representing an absolute position are calculated by the following expressions (15) to (20):

$$m_1 = \text{ROUND}\left(\frac{8 \cdot \theta_{V1} - \theta_{VS}}{2\pi}\right) \tag{15}$$

$$\theta_1 = \frac{2\pi m_1 + \theta_{VS}}{8} \tag{16}$$

$$m_2 = \text{ROUND}\left(\frac{40 \cdot \theta_1 - \theta_{P2\_2}}{2\pi}\right) \tag{17}$$

$$\theta_2 = \frac{2\pi m_2 + \theta_{P2\_2}}{40} \tag{18}$$

$$m_3 = \text{ROUND}\left(\frac{160 \cdot \theta_2 - \theta_{P1\_2}}{2\pi}\right) \tag{19}$$

$$\theta_3 = \frac{2\pi m_3 + \theta_{P1\_2}}{160} \tag{20}$$

The synchronous processor 35 outputs information on the absolute position $\theta_3$ thus calculated to the controller 40. The controller 40 outputs the information on the absolute position $\theta_3$ to the system of the apparatus.

A signal change amount of the second two phase signals corresponding to each of the second patterns 12 and 12' having long periods, with respect to a change of the relative position of the scale 10 and sensor 20, is smaller than that of each of the first two phase signals corresponding to the first patterns 11 and 11' having short periods. Therefore, the encoder of this embodiment can respond to a larger relative positional change at a faster relative movement speed. Thus, the encoder of this embodiment can increase a phase correctable range at a time at which an absolute position is to be calculated even if the scale 10 and the sensor 20 are relatively moved at a high speed, which results in suppression of position detection error and thereby in position detection with high accuracy.

Although this embodiment described the case of detecting (calculating) the absolute position at the specific time defined as $2t+2\Delta t$, an absolute position at a different specific time from $2t+2\Delta t$ may be detected. As in this embodiment, detecting the position at the time at which the last sampling has been performed or at a subsequent time allows calculation of a position at a time close to a time at which the system of the apparatus uses information on the detected position. On the other hand, detecting a position at a time at which a first sampling has been performed allows calculation of a position at a time close to a time at which the system of the apparatus outputs a position detection request signal.

Moreover, in this embodiment, since the relative movement speed u is assumed to be constant, the detected position might involve error due to a change in the relative moving speed during the position detection. However, the error can be decreased by calculating the position at the sampling time $t+2\Delta t$ of the P1 signals that decides the final detected position $\theta_3$. This is because the calculation of the position at the time $t+2\Delta t$ makes the phase $\theta_{P1\_2}$ equal to $\theta_{P1}$ and therefore error involved in the relative movement speed u does not influence the phase $\theta_{P1\_2}$.

Embodiment 3

FIG. 7 shows a configuration of an image pickup apparatus (or an optical apparatus) such as a digital still camera or a video camera, as an example of the apparatus equipped with the encoder described in each of Embodiments 1 and 2. This image pickup apparatus uses the encoder for detecting an absolute position of a movable lens in a lens barrel.

In FIG. 7, reference numeral 10 denotes a scale, reference numeral 20 denotes a sensor, reference numeral 30 denotes a position detector and reference numeral 40 denotes a controller. The scale 10, the sensor 20, the position detector 30 and the controller 40 constitute the encoder described in each of Embodiments 1 and 2. The scale 10 is attached to an inner circumferential surface of a cam ring 50 having a cylindrical shape and being rotatable about an optical axis in the lens barrel. The cam ring 50 is rotationally driven by an actuator (not shown).

The lens barrel houses an image capturing optical system 51. The image capturing optical system 51 includes a movable lens 52 (such as a magnification-varying lens or a focus lens). The movable lens 52 is moved in a direction of the optical axis by a cam formed in the cam ring 50 when the cam ring 50 is rotated.

Reference numeral 55 denotes a CPU that controls an entire system of the image pickup apparatus. Reference numeral 56 denotes an image sensor that photoelectrically converts an object image formed by the image capturing optical system 51. The image sensor 56 is constituted by a CCD sensor or a CMOS sensor.

When the cam ring 50 is rotated for moving the movable lens 52, an absolute rotation position of the cam ring 50, that is, the absolute position of the movable lens 52 in the optical axis direction is detected by the encoder, and information on the detected absolute position is output to the CPU 55.

The CPU 55 drives the actuator based on the information on the absolute position to rotate the cam ring 50 so as to move the movable lens 52 to a target position.

The encoder described in each of the above embodiments can be used not only for the image pickup apparatus, but also for various optical apparatuses such as a printer performing position detection of a print head or a sheet-supplying roller, a copier performing position detection of a photoconductive drum, and a robot performing position detection of a robot arm.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-105162, filed on May 2, 2012, which is hereby incorporated by reference herein in its entirety.

What is claimed is:

1. An encoder comprising:

a scale provided with a first periodic pattern and a second periodic pattern whose period is different from that of the first periodic pattern;

a sensor relatively movable with the scale and switchable to a first detection state to read the first periodic pattern and a second detection state to read the second periodic pattern, the sensor being configured to output in the first detection state a first periodic signal that changes with a change period corresponding to the first periodic pattern and to output in the second detection state a second periodic signal that changes with a longer change period corresponding to the second periodic pattern than that of the first periodic signal; and a processor configured to calculate a position in a relative movement direction of the scale and sensor by using both the first and second periodic signals taken in from the sensor, wherein the processor is configured (a) to take in the second periodic signal, the first periodic signal and the second periodic signal in this order at mutually different times, (b) to calculate phases of the second, first and second periodic signals and (c) to calculate the position at a specific time by using the calculated phases.

2. An encoder according to claim 1, wherein the processor is configured (a) to calculate a relative movement speed of the scale and sensor from the phases of the two second periodic signals among the second, first and second periodic signals taken in at the mutually different times and (b) to calculate phases of two or more periodic signals at the specific time by using the relative movement speed, the two or more periodic signals being two or more of the second, first and second periodic signals and having been taken in at times different from the specific time.

3. An encoder according to claim 1, wherein the scale is provided with two or more periodic patterns whose periods are mutually different as the first periodic pattern and with two or more periodic patterns whose periods are mutually different as the second periodic pattern, and wherein the sensor is configured to output two or more periodic signals whose change periods are mutually different corresponding to the periods of the first periodic patterns and two or more periodic signals whose change periods are mutually different corresponding to the periods of the second periodic patterns.

4. An apparatus comprising:

an encoder; and a movable member whose position is detected by using the encoder, wherein the encoder comprises:

a scale provided with a first periodic pattern and a second periodic pattern whose period is different from that of the first periodic pattern;

a sensor relatively movable with the scale and switchable to a first detection state to read the first periodic pattern and a second detection state to read the second periodic pattern, the sensor being configured to output in the first detection state a first periodic signal that changes with a change period corresponding to the first periodic pattern and to output in the second detection state a second periodic signal that changes with a longer change period corresponding to the second periodic pattern than that of the first periodic signal; and a processor configured to calculate a position in a relative movement direction of the scale and sensor by using both the first and second periodic signals taken in from the sensor, wherein the processor is configured (a) to take in the second periodic signal, the first periodic signal and the second periodic signal in this order at mutually different times, (b) to calculate phases of the second, first and second periodic signals and (c) to calculate the position at a specific time by using the calculated phases.

* * * * *